United States Patent
Suzumura et al.

(10) Patent No.: US 8,090,769 B2
(45) Date of Patent: Jan. 3, 2012

(54) DYNAMICALLY GENERATING WEB CONTENTS

(75) Inventors: Toyotaro Suzumura, Tokyo (JP); Michiaki Tatsubori, Kangawa-ken (JP); Scott Trent, Yokohama (JP); Akihiko Tozawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 12/336,230

(22) Filed: Dec. 16, 2008

(65) Prior Publication Data

US 2009/0300102 A1  Dec. 3, 2009

(30) Foreign Application Priority Data

May 30, 2008  (JP) .................................. 2008-142847

(51) Int. Cl.
*G06F 15/16* (2006.01)
(52) U.S. Cl. ....................................................... 709/203
(58) Field of Classification Search ........................ None
See application file for complete search history.

(56) References Cited

U.S. PATENT DOCUMENTS

| 2003/0028695 A1* | 2/2003 | Burns et al. ................... 710/200 |
| 2006/0015632 A1* | 1/2006 | Tiemann et al. ............... 709/230 |
| 2008/0114882 A1* | 5/2008 | Christenson .................. 709/228 |

OTHER PUBLICATIONS

"Lighty's Life Faster Fast CGI", [online], Nov. 29, 2006, lighty's life, http://blog.lighttpd.net/articles/2006/11/29/faster-fastcgi.

* cited by examiner

*Primary Examiner* — Ario Etienne
*Assistant Examiner* — Clayton R Williams
(74) *Attorney, Agent, or Firm* — Shimokaji & Assoc., P.C.

(57) ABSTRACT

Dynamically generating web contents includes an application execution unit for dynamically generating an HTML file, and an HTTP server for receiving an HTTP request and returning an HTTP response including an HTML file generated by the application execution unit. The application execution unit executes a script of the HTML file, and describes information specifying the file in the object without reading the actual file, if an instruction code of the script is a script to display contents of a specific file held in a storage device. The HTTP server identifies a file held in the storage device on the basis of the information, and transmits the file together with the HTML file.

12 Claims, 9 Drawing Sheets

```
<?php
  echo "hello" ;
  echo file_get_contents ( "fileA.html" ) ;
  echo "bye" ;
?>
```

FIG. 3

HEADER PORTION : X-FileString : 5/15/20

BODY PORTION : hello/tmp/fileA.html/tmp/fileA.html-linkbye

FIG. 6

CONVENTIONAL TECHNIQUE : T1+T2+T3+T4+T5+T6+T7

PRESENT EMBODIMENT : T1+T2+T3+ T5'+T6'+$\Sigma t\{i\}$+(COST OF *sendfile* SYSTEM CALL)

DIFFERENCE : T4+(T5−T5')+(T6−T6')+(T7−$\Sigma t\{i\}$)−(COST OF *sendfile* SYSTEM CALL)

FIG. 10

DYNAMICALLY GENERATING WEB CONTENTS

BACKGROUND OF THE INVENTION

The present invention relates to a server that provides web contents on a network, and in particular, relates to a server that dynamically generates and provides web contents.

A web application server for dynamically generating web contents is configured of an HTTP (HyperText Transfer Protocol) server as the front end, and a programming language processor (referred to as "application execution unit" below) as the back end. An approach to connect these two components to each other (SAPI: Server Application Programming Interface) includes FastCGI and mod_php.

There is provided an approach called Faster FastCGI, for example, to implement Fast CGI as an SAPI (for example, see "lighty's life Faster Fast CGI", [online], 29 Nov. 2006 lighty's life, [searched on 29 Feb. 2008], the Internet <URL: //blog.lighttpd.net/articles/2006/11/29/faster-fastcgi>). This approach is implemented by lighttpd 1.5 beta in an HTTP server. In this approach, a PHP processor writes an execution result out to a file assigned to a shared memory (/dev/shm), and passes its file name as an HTTP header (X-LIGHTTPD-tempfile) in the FastCGI protocol. Thus, a FastCGI module (mod-php) of the HTTP server transmits a message by use of a sendfile system call of the operating system (OS).

Generally, a web application server as described above carries out a series of operations: receiving a request from a client (HTTP client); generating an HTML (Hypertext Markup Language) file in response to the request; and returning the generated HTML file to the client, for example. Here, processing is executed while shifted between the HTTP server and an application execution unit, accompanied by memory copying repeatedly performed between a user space (user memory) and a kernel space (kernel memory) in the memory. In some operations of the application execution unit, necessary data is read from a storage device, and is also copied together with the data in the memory.

This memory copying operation requires a specific processing cost. Hence, repetition of redundant memory copying leads to performance degradation of the web application server as a whole.

Therefore, there is a need for reducing the processing cost caused by memory copying, and thereby improving the operational performance of the web application server.

SUMMARY OF THE INVENTION

In one aspect of the present invention, a server that generates an HTML file upon receipt of an HTTP request, comprises a processor, a memory coupled to the processor, an application execution unit configured to generate the HTML file based on the HTTP request, an HTTP server configured to receive the HTTP request and return an HTTP response to the HTTP request, the HTTP response including the HTML file generated by the application execution unit. The application execution unit is configured to execute a script in generating the HTML file; and generate an object constituting the HTML file without reading a specific file if an instruction code of the script corresponds to the specific file and does not request modification to contents of the specific file. The generated object contains a link to the specific file, which is accessible by the HTTP server. If the HTML file generated by the application execution unit includes the object generated by the processing without reading the file, and if an original instruction code of the object requests transmission of the specific file, the HTTP server transmits the specific file together with the HTML file, wherein an un-updated file is transmitted by a link name, and an updated file is transmitted by an original file name.

In another aspect of the present invention, a server that generates an HTML file upon receipt of an HTTP request, comprises a processor, a memory coupled to the processor, an application execution unit configured to generate the HTML file based on the HTTP request, and an HTTP server configured to receive the HTTP request and return an HTTP response to the HTTP request, the HTTP response including the HTML file generated by the application execution unit. The HTTP response is transmitted without a copy to user memory. The application execution unit executes a script in generating the HTML file; and writes, if an instruction code of the script is an instruction code to display contents of the specific file held in a storage device, information specifying a path to a specific file in an object without reading the specific file. If the HTML file generated by the application execution unit includes the object in which the information specifying the file is written, the HTTP server identifies the specific file on a basis of the information and transmits the file together with the HTML file.

More preferably, with respect to the instruction code to display contents of a specific file held in a storage device, if a writing operation is performed on the file before the transmission of the file by the HTTP server, the application execution unit generates and retains a copy of the file on which the writing operation has not yet been performed. Then, the HTTP server transmits the file on which the writing operation has not yet been performed.

To be more specific, the application execution unit generates a copy when the writing operation is performed on the file, by use of a hard link having a Copy-on-write function implemented in an OS.

Otherwise, the application execution unit locks the file, generates a hard link to a copy of the file, monitors writing to the file, actually generates the copy when a writing operation is carried out, and unlocks the file after transmitting the copy to the HTTP server.

In each of these servers, the following configuration may be employed. That is, if an instruction code of the script is an instruction code for a file other than the instruction code to display contents of a file, and if contents of the file are to be changed, the application execution unit reads the file, performs processing and generates an object.

In a further aspect of the present invention, a method for generating an HTML file upon receipt of an HTTP request, comprises executing, based on the HTTP request, a script for generating the HTML file, and if an instruction code of the script corresponds to a specific file and does not request modification to contents of the specific file, performing processing to generate an object without reading the specific file, wherein the generated object contains a link to the specific file handling file processing by a dedicated character string object, reading, by an HTTP server, the generated object, in response to reading the generated object, directly loading the specific file to a socket buffer for transmission provided in a kernel space of a memory, if the instruction code requests transmission of the specific file; and transmitting the generated HTML file together with the specific file loaded to the socket buffer as an HTTP response.

In still yet a further aspect of the present invention, a program product including a non-transitory storage medium readable by a media drive and including instructions for causing a computer to function as application execution means for generating an HTML file based on an HTTP request, and an HTTP server for receiving the HTTP request and returning an HTTP response to the HTTP request, the HTTP response including the HTML file generated by the application execution means. The HTTP request is received by the HTTP server without receiving the HTML file. The application execution means executes a script in generating the HTML file, and performs, if an instruction code of the script corresponds to a specific file and does not request modification to contents of the specific file, processing to generate an object having a path to the specific file without reading the specific file. With respect to the object generated by the application execution means through the processing without reading the specific file, if the original instruction code requests transmission of the specific file, the HTTP server transmits the specific file together with the HTML file generated by the application execution means.

These and other features, aspects and advantages of the present invention will become better understood with reference to the following drawings, description and claims.

BRIEF DESCRIPTION OF THE DRAWINGS

FIG. 3 is a diagram illustrating an exemplar PHP script used in the embodiment.

FIG. 6 is a diagram illustrating a configuration example of a FastCGI packet in the embodiment.

FIG. 10 is a chart for comparing the cost of time for memory copying between this embodiment and the conventional case.

DETAILED DESCRIPTION OF THE PREFERRED EMBODIMENT

The following detailed description is of the best currently contemplated modes of carrying out the invention. The description is not to be taken in a limiting sense, but is made merely for the purpose of illustrating the general principles of the invention, since the scope of the invention is best defined by the appended claims.

<System Configuration>

Figure 1:
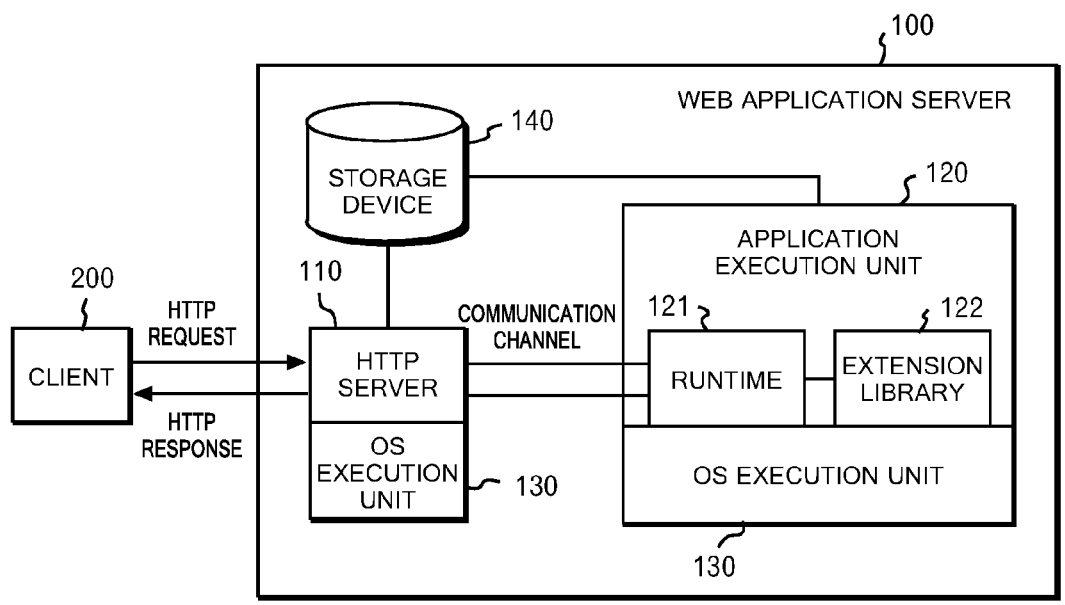
FIG. 1 is a diagram illustrating a functional configuration of a web application server of this embodiment.

FIG. 1 is a diagram illustrating a functional configuration of a web application server of this embodiment.

A web application server 100 shown in FIG. 1 can be implemented by a computer such as personal computer, and may include an HTTP server 110, an application execution unit 120, an OS execution unit 130 and a storage device 140. The web application server 100 may also be connected to a client 200 through a network.

Suppose that a PHP (PHP: Hypertext Preprocessor) processor is used as the application execution unit 120 in this embodiment. Also suppose that FastCGI is used as the communication channel (SAPI) between the HTTP server 110 and the application execution unit 120. As shown in FIG. 1, the application execution unit 120 includes an ordinary PHP runtime library (simply referred to as "runtime" below) 121 and an extension library 122 having an extended function in this embodiment.

Figure 2:
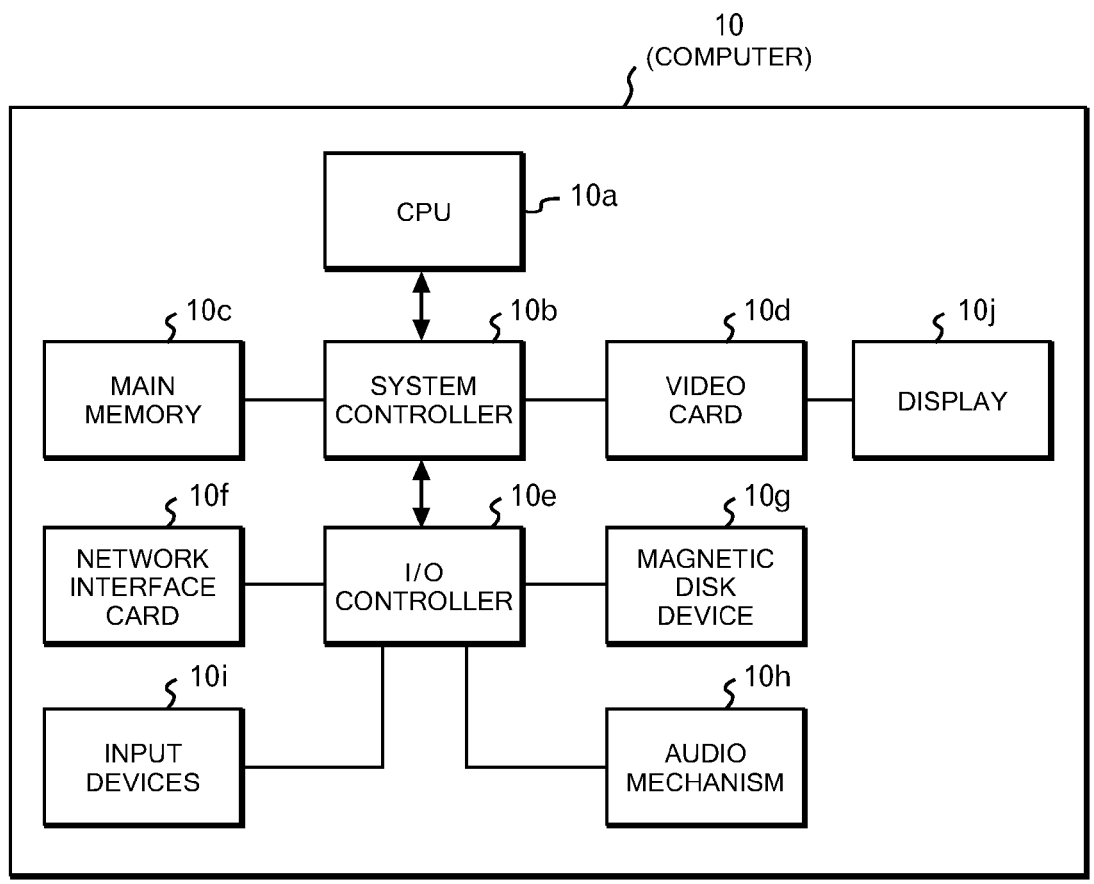
FIG. 2 is a diagram illustrating a hardware configuration example of a computer to which the embodiment is applied.

FIG. 2 is a diagram illustrating a hardware configuration example of a computer to which the embodiment is applied.

A computer 10 shown in FIG. 2 may include a central processing unit (CPU) 10a which is calculating means, and a main memory 10c and magnetic disk device (HDD: Hard Disk Drive) 10g which are storage means. The computer 10 may also include a network interface card 10f for connection to an external device through a network, a video card 10d and a display 10j for displaying, and an audio mechanism 10h for audio output. Moreover, the computer 10 may include input devices 10i such as a keyboard and a mouse.

As shown in FIG. 2, the main memory 10c and the video card 10d are connected to the CPU 10a through a system controller 10b. Meanwhile, the network interface card 10f, the magnetic disk device 10g, the audio mechanism 10h and input devices 10i may be connected to the system controller 10b through an I/O controller 10e. Each component can be connected by various buses such as a system bus and an input/output bus. For example, the CPU 10a and the main memory 10c may be connected by a system bus or a memory bus. The CPU 10a and any of the magnetic disk device 10g, the network interface card 10f, the video card 10d, the audio mechanism 10h and the input devices 10i are connected by an input/output bus such as Peripheral Components Interconnect (PCI), PCI Express, serial AT Attachment (ATA), Universal Serial Bus (USB), and Accelerated Graphics Port (AGP).

It should be noted that FIG. 2 merely shows an exemplar hardware configuration of a computer to which this embodiment is preferably applied, and an actual server is not limited to the illustrated configuration, as a matter of course. For instance, instead of providing the video card 10d, a video memory alone may be installed so that image data is processed by the CPU 10a. Instead of the provision as an independent component, the audio mechanism 10h may be included as a function of a chip set constituting the system controller 10b or the I/O controller 10e. Meanwhile, as an auxiliary storage device, a drive for media such as various optical disks and a flexible disk may be provided, in addition to the magnetic disk device 10g. Although a liquid crystal display is mainly used as the display 10j, a display employing any displaying system such as a CRT display and a plasma display may be used.

In the web application server 100 shown in FIG. 1, each of the functions of the HTTP server 110, the application execution unit 120 and the OS execution unit 130 may be implemented by the CPU 10a executing a program loaded to the main memory 10c, in the computer shown in FIG. 2, for example. The storage device 140 can be implemented by the magnetic disk device 10g. The user memory used by an application and the kernel memory used by the OS can be implemented by the main memory 10c.

In FIG. 1, the HTTP server 110 is a server which operates on the OS to perform HTTP communication through the network, and which receives an HTTP request from the client 200 to forward it to the application execution unit 120. Then, the HTTP server 110 returns a process result received from the application execution unit 120 to the client 200, as an HTTP response. The HTTP request received from the client 200 is first stored in a socket buffer of the kernel memory, and then is loaded to the user memory used by an application of the HTTP server 110. In contrast, when an HTTP response is transmitted, the response may firstly be stored in the socket buffer of the kernel memory, and may then be transmitted to the client 200. In addition, to reduce the load of memory copying between the user memory and the kernel memory, the HTTP server 110 of this embodiment may carry out processing corresponding to an extended function assigned to the application execution unit 120. Details of this function will be described later.

The application execution unit 120 is a PHP processor operating on the OS, and may dynamically generate an HTML file by use of the runtime 121 and the extension library 122, in response to an HTTP request received by the HTTP server 110. The web application server 100 holds original HTML files from which each specific HTML file to respond to an HTTP request is generated. Each of these original HTML files includes a PHP script that may be executed in response to an HTTP request. This PHP script may be executed by the application execution unit 120, and thereby an object (web object) is generated. Then, a specific HTML file corresponding to the HTTP request may be dynamically generated by embedding the generated object in the original HTML file.

As shown in FIG. 1, the application execution unit 120 includes the runtime 121 and the extension library 122. The runtime 121 is an ordinary runtime library for executing a PHP script. In the application execution unit 120 of this embodiment, a function for reducing the load of memory copying is also provided by the runtime 121. The extension library 122 (referred to as "extension" in PHP) may provide an auxiliary function used in the mechanism for reducing the load of memory copying in this embodiment. Details of operations of the application execution unit 120 using the libraries and the functions thereof will be described later.

The OS execution unit 130 executes the OS, and provides basic functions of the web application server 100. The HTTP server 110 and the application execution unit 120 operate on this OS. Incidentally, for the sake of convenience, multiple OS execution units 130 are shown so as to respectively correspond to the HTTP server 110 and the application execution unit 120 in FIG. 1. However, actually, the HTTP server 110 and the application execution unit 120 operate on the same OS.

The storage device 140 holds original HTML files from which the application execution unit 120 may dynamically generate each specific HTML file. The storage device 140 also holds predetermined data. The data is written to an HTML file generated by the application execution unit 120. In this embodiment, the function provided by the extension library 122 of the application execution unit 120 allows the HTTP server 110 to read, at the time of transmitting an HTTP response, data from the storage device 140, and then to write the data to an HTML file.

<Adoption of File-Type Character String Object>

In the HTTP server 110 of the web application server 100 having the above configuration, memory copying from the socket buffer of the kernel memory to the user memory is performed upon receipt of data. Meanwhile, upon transmission of data, memory copying from the user memory to the socket buffer of the kernel memory may be performed. Moreover, transmission and reception of data between the HTTP server and the application execution unit 120 may be carried out through a kernel memory managed by the OS. Accordingly, every time data is forwarded from one to the other, memory copying is performed twice between the user memory and the kernel memory.

In order to implement a scheme of reducing this load of memory copying, this embodiment adopts a character string object for specially handling file processing, as one of objects constituting an HTML file. This character string object is referred to as a "file-type character string object". An ordinary character string object (such as "$a" of $a=file_get_contents ("/tmp/fileA.htmr") written in PHP script) for holding contents of a file (data held in the storage device 140) holds the entire contents of the file. On the other hand, the file-type character string object of this embodiment only holds the file name (URI) of the file. This implementation may be transparent to the application program, and holds the same semantics as an ordinary character string object.

If contents of a file are required for character string operation or the like, a file-type character string object may actually read the file and holds its contents as similar to an ordinary character string object. However, as for information such as the length of a character string or a hash value, which can be acquired from the header or the like of a file, the file-type character string object may acquire the information without actually reading the file.

This acquisition of contents of a file by the file-type character string object is carried out by the HTTP server 110. In order to request the HTTP server 110 to carry out the processing of the file-type character string object, the application execution unit 120 may add special information to the header of a message in FastCGI protocol, which is transmitted from the application execution unit 120 to the HTTP server 110. This header information is referred to as "X-FileString header". A position of a file name included in the body portion of a FastCGI message (an offset value indicating the position of the first character of the file name, and the length of the file name) is written in an X-FileString header. The HTTP server 110 identifies a file according to this X-FileString header, and transmits the file to the client 200 by use of a sendfile system call of the OS, for example.

Hereinbelow, an outline of the procedure of data processing by use of the file-type character string object will be described by citing a concrete example of a PHP script.

Consider a PHP script as shown in FIG. 3, for example. This PHP script is described in a pattern often used in a web application, and may be used to display characters "hello", contents of an HTML file A (document), and characters "bye".

The application execution unit 120 firstly parses the PHP script and may translate it into an instruction code. Then, the application execution unit 120 can execute the translated instruction code. At this time, when executing an instruction code corresponding to ECHO (display character string in the standard output), the application execution unit 120 may determine whether or not the target variable is a file-type character string object.

If the variable is assigned to the instruction code for a file-type character string object, the application execution unit 120 may add a URI (/tmp/fileA.html) for the file name, instead of contents of the file, to the FastCGI packet. The application execution unit 120 also describes X-FileString as the header information, and specifies an offset value indicating the position of the file name in the FastCGI packet, and the length of the file name.

Thereafter, the FastCGI packet generated by the application execution unit 120 is transmitted to the HTTP server 110 to be processed. The HTTP server 110 parses the header of the received FastCGI packet. On finding an X-FileString header, the HTTP server 110 returns a file designated by the X-FileString header to the client 200 by use of a sendfile system call, instead of just forwarding the FastCGI packet to the socket.

As has been described, according to this embodiment, a file that does not require processing by the application execution unit 120 may be acquired by the HTTP server 110 instead of the application execution unit 120, and then may be transmitted to the client 200. For this reason, memory copying by the application execution unit 120 for acquiring the file can be omitted, and the file is not copied either, even in the memory copying carried out when the application execution unit 120 transmits the FastCGI packet to the HTTP server 110. Moreover, when the HTTP server 110 returns a response to the client 200, the file is transmitted directly from the kernel memory to the client 200 without the intervention of the user memory. Accordingly, the amount of omission of memory copying for the file contributes to reduction in the processing cost accordingly, and thus improves the operational performance of the web application server 100.

Incidentally, when the web application server 100 operates by the above procedure, there is a difference between the time when the application execution unit 120 executes the instruction code, and the time when the HTTP server 110 acquires the file designated by the instruction code. Accordingly, contents of the file to be transmitted could be updated during the time period of this delay. Meanwhile, an assurance is needed in identification that the file to be transmitted has the same contents as those the file had at the time of execution by the application execution unit 120. In this regard, this embodiment can assure the contents of the files by a scheme using a hard link including a Copy-on-write function on the OS level or the PHP processor level. This function is provided by the extension library 122 in the embodiment. Details of the method of assuring the contents of the files by use of the hard link will be described later.

<Function Provided by Library and Operation of Application Execution Unit>

Next, detailed descriptions will be given of a function provided by the runtime 121 and the extension library 122, and operations of the application execution unit 120.

The application execution unit 120 may acquire an HTTP request from the client 200 through the HTTP server 110, and may dynamically generate an HTML file which becomes an HTTP response in response to the HTTP request. At this time, the application execution unit 120 executes a PHP script written in the HTML file which becomes the HTTP response, by use of the runtime 121 and the extension library 122.

Figure 4:
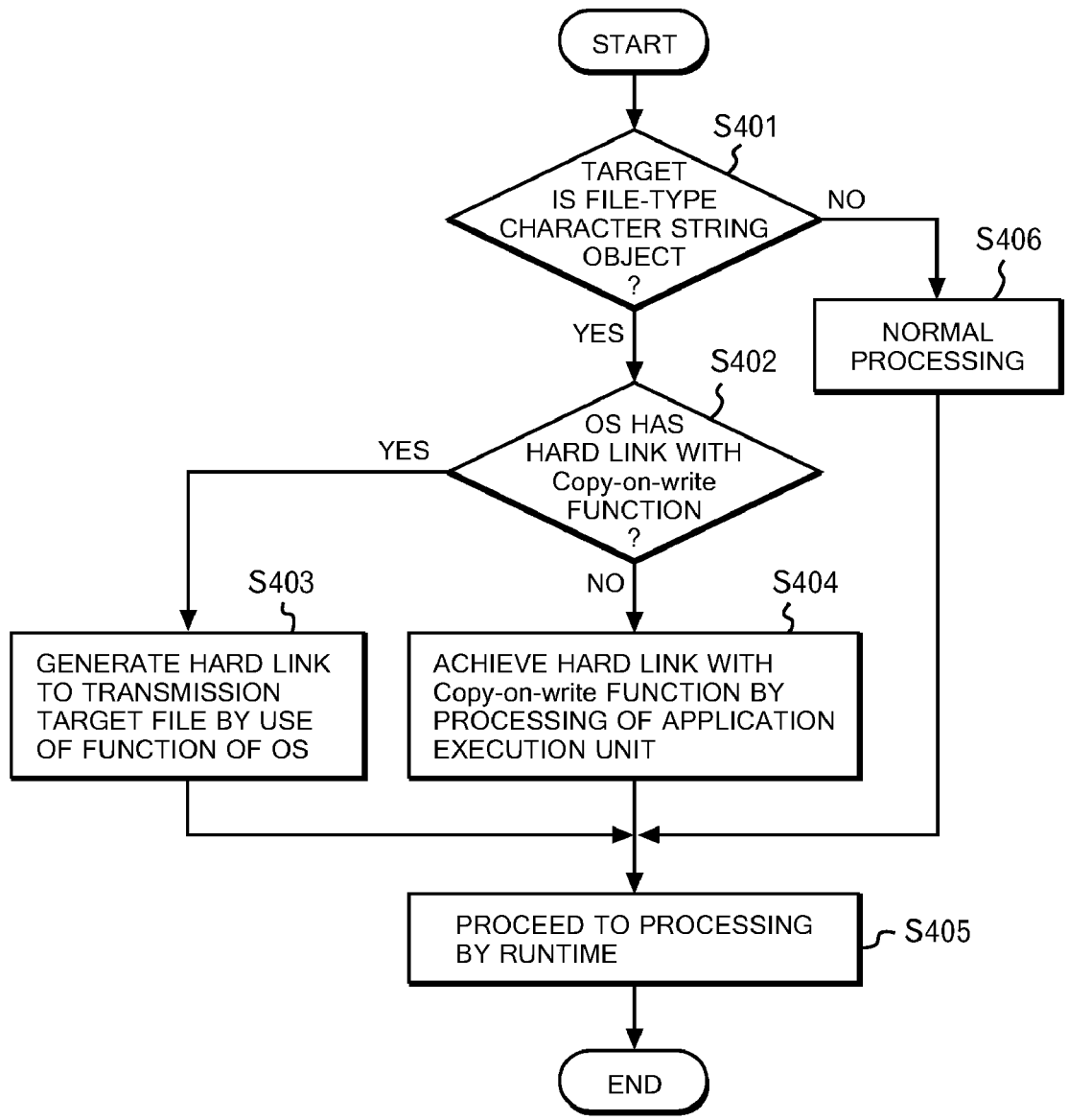
FIG. 4 is a flowchart illustrating operations of an application execution unit carried out by an extension library of the embodiment.

FIG. 4 is a flowchart illustrating operations of the application execution unit 120 carried out by the extension library 122.

The application execution unit 120 sequentially acquires instruction codes of a PHP script, and performs processing by use of the extension library 122. As shown in FIG. 4, the application execution unit 120 firstly determines whether or not a character string being a target of processing by the instruction code is a file-type character string object (step 401). Whether or not a processing target is a file-type character string object can be determined based on a function or the like of the instruction code. For instance, a processing target is determined to be a file-type character string object if the function thereof is "file_get_contents" or the like. Specifically, a definition may be made in advance on which instruction codes and functions should be the bases of determination of the processing target as being a file-type character string object.

On determining that the processing target is a file-type character string object, the application execution unit 120 then may determine whether or not the OS of the web application server 100 has a hard link corresponding to Copy-on-write (step 402). If the OS includes this function (such as ext3cow and WFS), the application execution unit 120 can generate a hard link to the transmission target file by use of this function of the OS (by making a request to the OS execution unit 130) (step 403). The hard link may be generated based on the file name of the original file (that is, the file read by the function of the instruction code).

Having undergone the processing in step 403, the character string object (file-type character string object) has the following attributes.

TYPE:FILE
VALUE:/tmp/fileA-link.html
ORIGINAL:/tmp/fileA.html
Cow-handler:OS

Here, "TYPE" indicates the type of character string object, and "FILE" indicates that the type of character string object is a file type. "VALUE" indicates the file name of the file to be transmitted by the HTTP server 110. "ORIGINAL" indicates the file name of the hard-linked original file. "Cow-handler" indicates which level the Copy-on-write function is implemented, and in this case, indicates that the OS provides the function.

Meanwhile, if the OS does not contain a hard link corresponding to Copy-on-write, the application execution unit 120 can perform the following processing so as to provide a similar function by itself (step 404).

(1) Lock /tmp/fileA.html to avoid writing operations performed by the other processes.

(2) Generate a hard link from /tmp/fileA.html to /tmp/fileA-link.html.

(3) Generate the following character string object.
TYPE:FILE
VALUE:/tmp/fileA-link.html
ORIGINAL:/tmp/fileA.html
Cow-handler:PHP (4) Monitor writing to fileA.html by use of a function write or the like. Then, if writing may be performed on fileA.html, make a copy of fileA-link.html (this operation is carried out by the application execution unit 120).

(5) UnlockfileA.html when the HTTP server 1 transmits fileA-link.html.

The character string object generated in step 404 is mainly the same as that generated in step 403, apart from "Cow-handler" that can indicate the implementation level of the Copy-on-write function, which in this case is PHP. Among the above operations, operations (4) and (5) are carried out only in the following case. Specifically, the operations are carried out only if writing is performed on the file in a period of time from when the runtime 121 performs processing after the character string object is generated in (3), until the HTTP server 110 acquires the file.

After generating the hard link in the above manner, the application execution unit 120 moves on to the processing by use of the runtime 121 (step 405). Meanwhile, on determining in step 401 that the processing target is not a file-type character string object, the application execution unit 120 performs, if necessary, the same processing as normal processing of the PHP processor by use of the extension library 122 (step 406), and then moves on to the processing by use of the runtime 121 (step 405).

Figure 5:
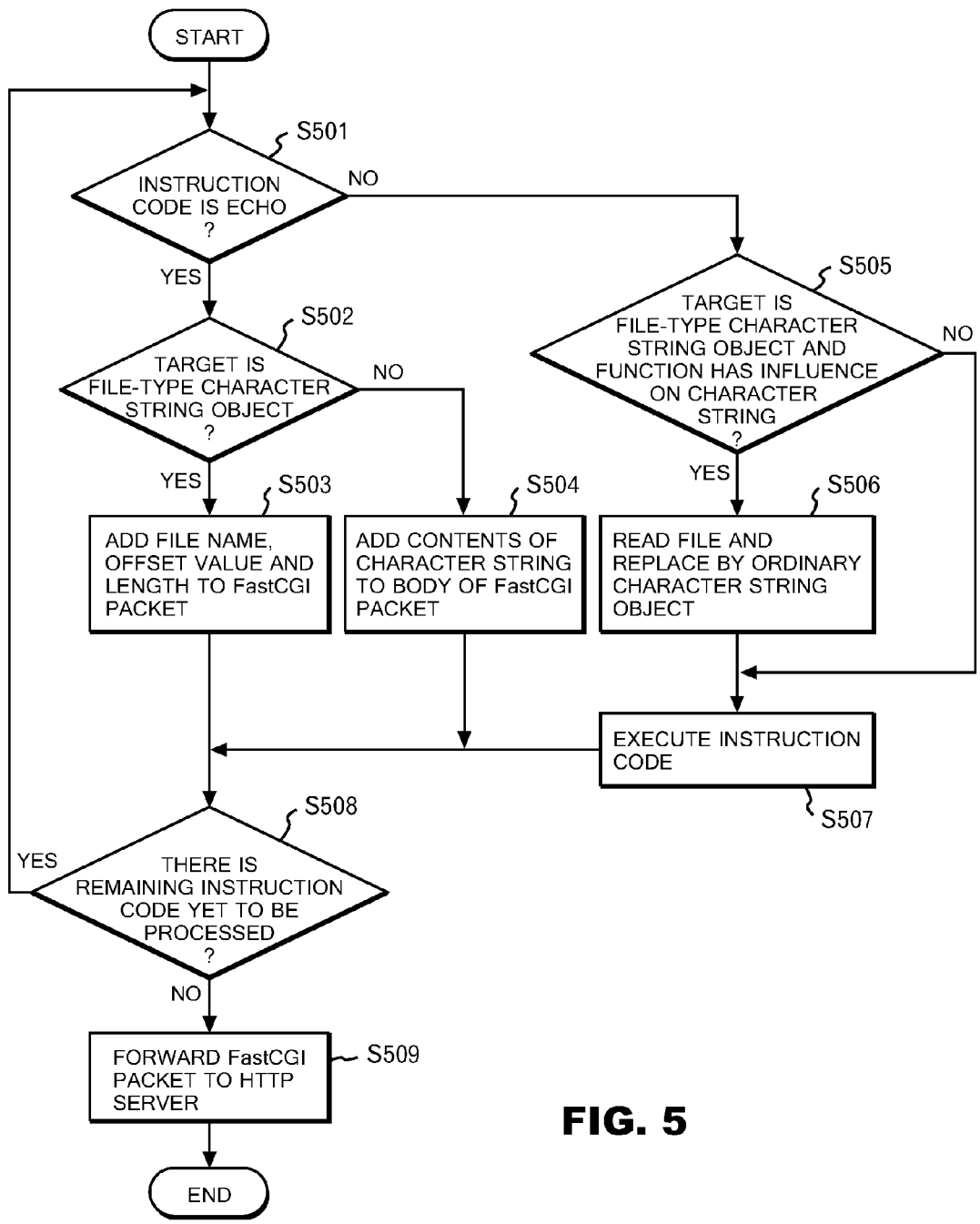
FIG. 5 is a flowchart illustrating operations of the application execution unit carried out by a runtime of the embodiment.

FIG. 5 is a flowchart illustrating operations of the application execution unit 120 carried out by the runtime 121.

As shown in FIG. 5, the application execution unit 120 sequentially can acquire the instruction codes having undergone the processing by the extension library 122. Then, the application execution unit 120 may determine whether or not each of the instruction codes is "ECHO" (step 501).

If the instruction code is "ECHO", the application execution unit 120 then can determine whether or not the object being a target of processing is a file-type character string object (step 502). On determining that the object is a file-type character string object, the application execution unit 120 may add a file name included in the value of the object into a body portion of a packet of FastCGI used as an SAPI. The application execution unit 120 also can add an offset value indicating the position of the file name and the length of the file name, into the X-FileString header of the FastCGI packet (step 503). At this time, information related to the hard link (link name and length of link name) generated by the extension library 122 may also be added into each of the body portion of the FastCGI packet and the X-FileString header. A format of the X-FileString header is as follows, for example.

X-FileString:

offset value/length of original file name/length of link name

To be specific, in the case of executing the PHP script in FIG. 3, for example, suppose that the link name of the hard link is "/tmp/fileA.html-link." The header portion (X-FileString header) and the body portion of the FastCGI packet can be expressed as in FIG. 6.

Meanwhile, on determining in step 502 that the object being a processing target is an ordinary object and not a file-type character string object, the application execution unit 120 then can add contents of the character string (value of String) to the body portion of the FastCGI packet (step 504).

If the acquired instruction code is not "ECHO" in step 501, the application execution unit 120 then may determine whether or not the object is a file-type character string object and the function to be executed has an influence on the character string (step 505). Here, a function having an influence on a character string is the trim function, for example, which eliminates blanks from a character string. Specific functions that influence a character string may be defined in advance.

If the object meets the condition that the object is a file-type character string object and the function has an influence on the character string, the application execution unit 120 then can read the processing target file and can replace the file-type character string object by an ordinary character string object (step 506). Thereafter, the application execution unit 120 may execute the instruction code acquired in step 501, and generates a FastCGI packet (step 507). In the case of the following PHP script, for example, the file (fileA.html) is actually loaded and processing for an ordinary character string object is performed.

<?php $a=file_get_contents("/tmp/fileA.html"): echo trim ($a); ?>

Meanwhile, if the object is not a file-type character string object, or if the function does not have an influence on the character string, the application execution unit 120 directly executes the instruction code acquired in step 501, and can generate a FastCGI packet (step 507). In other words, although the object is a file-type character string object, the instruction code is executed without reading the processing target file if the function does not influence the character string.

After generating the FastCGI packet in steps 503, 504 or 507, the application execution unit 120 can check whether there is left an instruction code yet to be processed (step 508). Then, the processes of steps 501 to 507 may be sequentially performed on each instruction code of the PHP script. When the processing is completed for all of the instruction codes, the application execution unit 120 can pass the generated FastCGI packet to the HTTP server 110 through the communication channel (SAPI) (step 509).

<Operations of HTTP Server>

Next, a description will be given of operations of the HTTP server 110 for an HTTP file thus generated by the application execution unit 120.

A basic operation of the HTTP server 110 is to return an HTML file generated by the application execution unit 120 to the client 200, as a response to a received HTTP request. Here, if the instruction code of the PHP script in the original HTML file is "ECHO", contents of the file designated by the object may need to be transmitted to the client 200 together with the HTML file. However, since the transmission target file is not read by the application execution unit 120 in this embodiment as described above, contents of the file may not be embedded in the corresponding object in the HTML file. Hence, the HTTP server 110 reads the transmission target file from the storage device 140 and transmits the contents of the file to the client 200, together with the HTML file.

Figure 7:
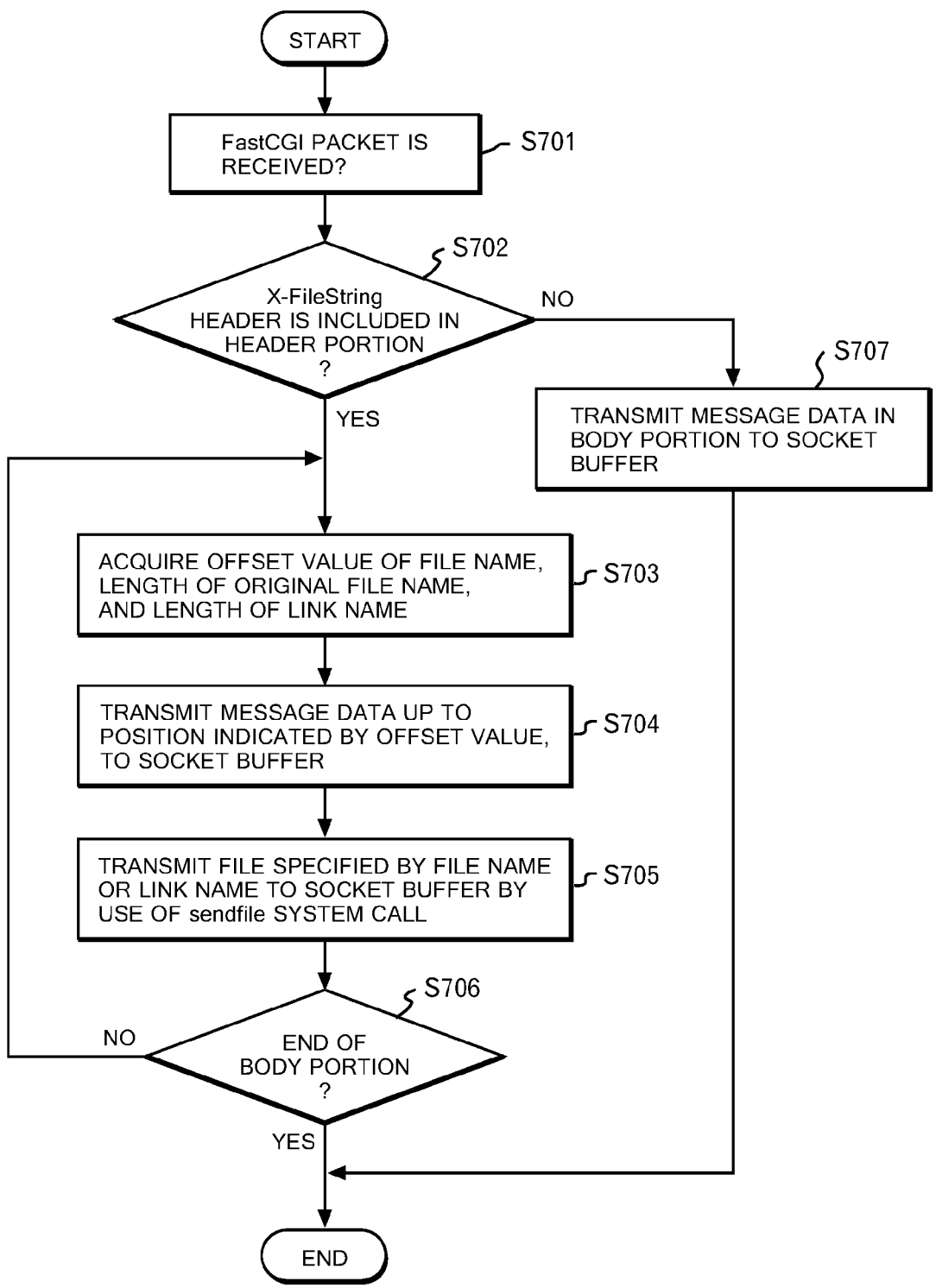
FIG. 7 is a flowchart illustrating operations of data processing by an HTTP server of the embodiment, at the time of transmitting an HTML file.

FIG. 7 is a flowchart illustrating operations of data processing by the HTTP server 110, at the time of transmitting an HTML file.

As shown in FIG. 7, upon receipt of a FastCGI packet from the application execution unit 120 (step 701), the HTTP server 110 may determine whether or not an X-FileString header is included in the header portion of the FastCGI packet (step 702). If an X-FileString header is included therein, the HTTP server 110 performs a series of processes below (steps 703 to 706).

The HTTP server 110 firstly may acquire an offset value of a file name, the length of an original file name, and the length of a link name which are described in the X-FileString header of the FastCGI packet (step 703). Then, the HTTP server 110 focuses on the body portion of the FastCGI packet, starting from the first data to the next sequentially, and transmits specific message data described in the body portion to the socket buffer (step 704). The message data to be transmitted ranges from the current position (top position at initial time) to the position indicated by the offset value acquired in step 703.

Then, on the basis of the length of the file name and the link name acquired in step 703, the HTTP server 110 may acquire the file name and the link name described in the body portion of the FastCGI packet. The HTTP server 110 then transmits a file specified by this file name or link name to the socket buffer by use of a sendfile system call (step 705). At this time, the HTTP server 110 may check whether the target file has been updated by using this file name, link name and a stat system call. If the file has not been updated, the HTTP server 110 can transmit the file specified by the link name (a copy file generated by the application execution unit 120 by use of the extension library 122) to the socket buffer. In contrast, if the file has been updated, the HTTP server 110 may transmit the file specified by the original file name to the socket buffer. Since the file is transmitted by use of a sendfile system call in this processing, the target file may be directly transmitted to the socket buffer after being read from the storage device 140 and stored in a file buffer of the kernel memory. That is, files are not copied from a user memory used by the application of the HTTP server 110 to the kernel memory including the socket buffer.

Subsequently, the HTTP server 110 can determine whether or not the current focus position in the body portion of the FastCGI packet has reached the end of the body portion (step 706). If not, the processing goes back to step 703 and the processes of steps 703 to 705 are repeated. Incidentally, the processes of steps 704 and 705 are skipped as needed if there is no corresponding data (character string which is not a file name, original file name, or link name).

When the current focus position reaches the end of the body portion, the data processing by the HTTP server 110 may be terminated. If it is determined in step 702 that an X-FileString header is not included in the header portion of the FastCGI packet, the HTTP server 110 can transmit the message data written in the body portion of the FastCGI packet to the socket buffer, without performing any special data processing (step 707).

The HTTP server 110 can transmit the data transmitted to the socket buffer in the above manner, to the client 200 as an HTTP response.

The above-mentioned operations will be described by using the PHP script in FIG. 3 and the FasCGI packet in FIG. 6 as an example.

In this case, the message "hello" indicating characters corresponding to offset from 0 to 4 in the body portion of the FastCGI packet is firstly transmitted to the socket buffer (see step 704 in FIG. 7). Then, a file is transmitted to the socket buffer (see step 705 in FIG. 7) according to the file name "/tmp/fileA.html" or the link name "/tmp/fileA.html-link". Thereafter, since the focus position does not reach the end of the body portion, the processing of step 703 and the following steps are repeated, so that the message "bye" indicating characters corresponding to offset from 40 to 42 is transmitted to the socket buffer (step 704 in FIG. 7).

<Explanation of Reducing Load Caused by Memory Copying>

Figure 8:
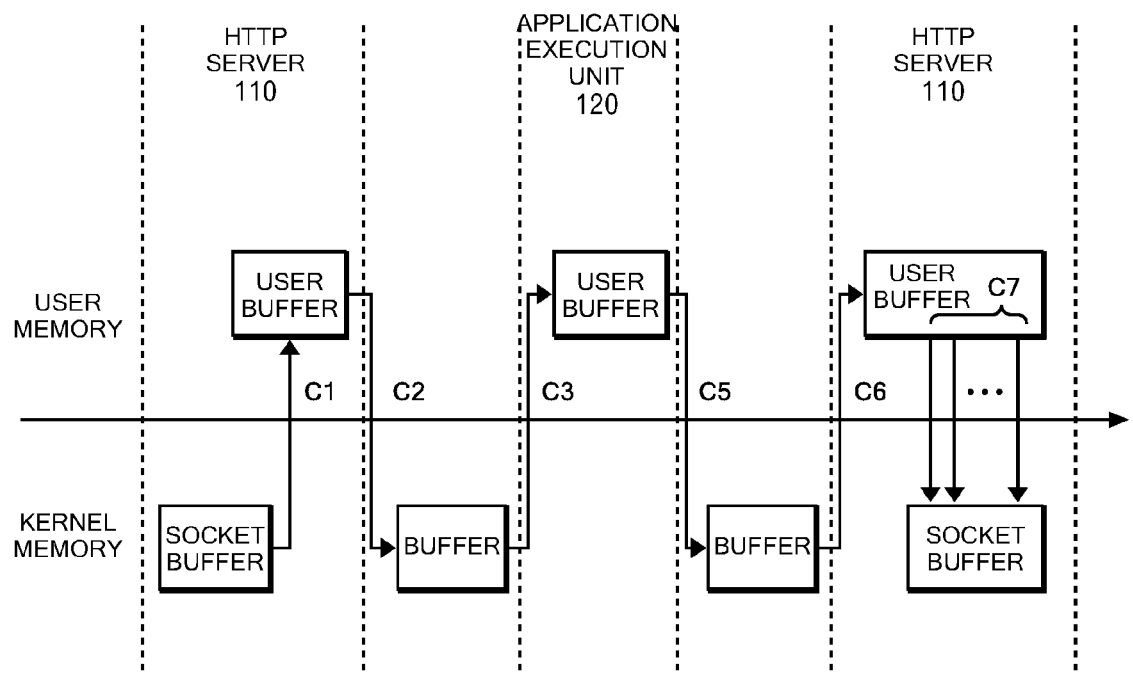
FIG. 8 is a diagram illustrating a state of memory copying in operation of a web application server of the embodiment.
Figure 9:
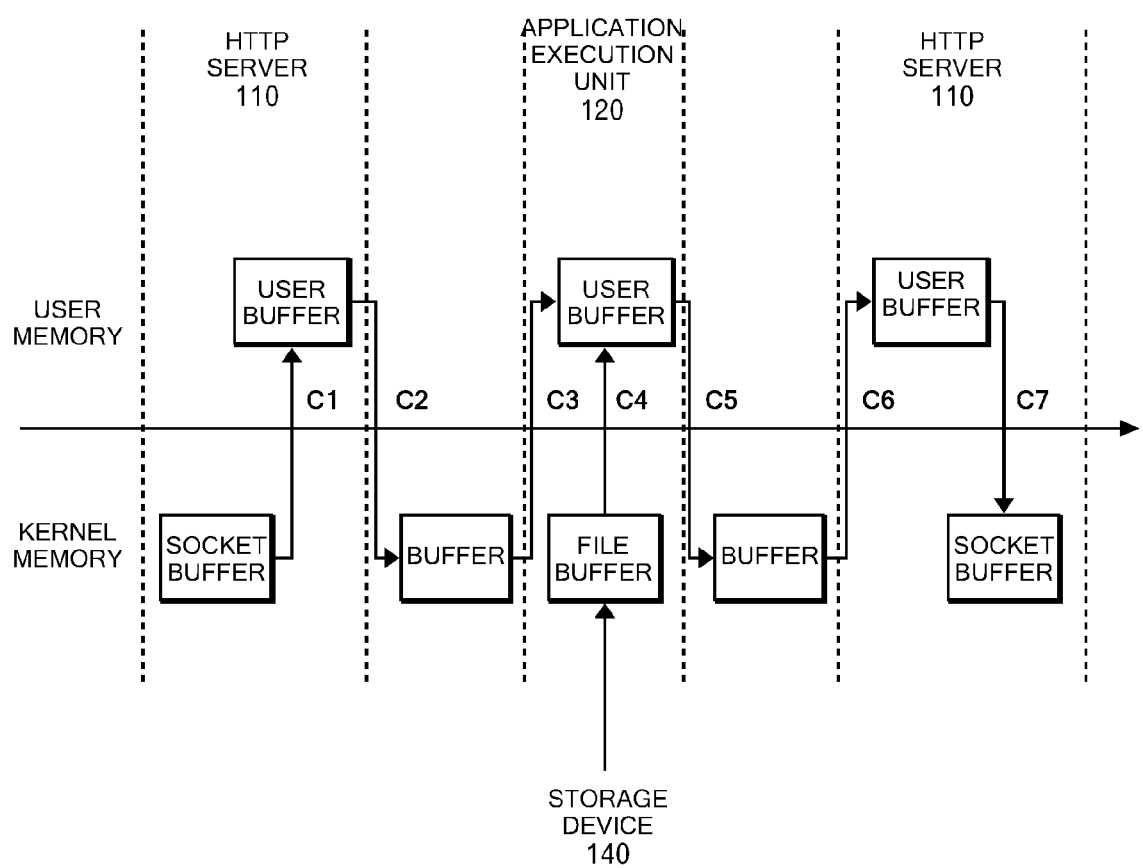
FIG. 9 is a diagram illustrating a state of memory copying in operation of a conventional web application server.

FIG. 8 is a diagram illustrating a state of memory copying in the operations of the web application server of this embodiment. FIG. 9 is a diagram illustrating a state of memory copying in the operations of a conventional web application server. Note that FIGS. 8 and 9 illustrate operations in cases where the instruction code of the PHP script is "ECHO".

With reference to FIG. 8, memory copying may be performed once (C1) when the HTTP server 110 receives an HTTP request, twice (C2 and C3) when data is transferred from the HTTP server 110 to the application execution unit 120, twice (C5 and C6) when data is transferred from the application execution unit 120 to the HTTP server 110, and several times (C7) when the HTTP server 110 transmits an HTTP response. Here, the memory copying at the time of transmitting an HTTP response by the HTTP server 110 may be repeated according to the number of repetitions of the alternate calling of an echo and a file_get_contents function.

With reference to FIG. 9, in addition to the memory copying operations performed in FIG. 8, another memory copying may be performed (C4) when the file is read from the storage device 140 during the processing by the application execution unit 120. Meanwhile, the memory copying (C7) at the time of transmitting an HTTP response by the HTTP server 110 may be performed only once.

Durations of time required for each of the memory copying operations (C1 to C7) in FIG. 9 are represented by T1, T2, T3, T4, T5, T6 and T7, respectively, in the order of their occurrences. Meanwhile, durations of time required for each of the memory copying operations (C1 to C3, and C5 to C7) in FIG. 8 may be similarly represented by T1, T2, T3, T5', T6' and $\Sigma t\{i\}$, respectively, in the order of their occurrences. Note that i in $\Sigma t\{i\}$ denotes the number of times of memory copying performed when the HTTP server 110 transmits an HTTP response.

A comparison between FIGS. 8 and 9 indicates that the same duration of time may be required for the three memory copying operations (C1 to C3) performed until the HTTP request is transferred to the application execution unit 120 (T1, T2 and T3). In FIG. 8 illustrating the operations of the embodiment, the application execution unit 120 does not read the file, and thus memory copy C4 does not exist. In addition, since the data transferred from the application execution unit 120 to the HTTP server 110 does not include the file, the transferred data volume is less than in the case in FIG. 9. Hence, in the memory copying operations C5 and C6, T5>T5' and T6>T6' are true. Meanwhile in FIG. 8, the memory copying at the time of transmitting the HTTP response by the HTTP server 110 requires time for executing a sendfile system call, in addition to $\Sigma t\{i\}$. Accordingly, as shown in FIG. 10, a comparison can be made between the total duration of time required for the memory copying of this embodiment illustrated in FIG. 8, and the conventional memory copying illustrated in FIG. 9.

The operations of this embodiment require cost of time for the multiple times of memory copying performed in $\Sigma t\{i\}$ and for the sendfile system calls executed at that time, in addition to the cost of time for the conventional operations. However, since an enormous amount of time cost is required for performing memory copying for a large file, generally, one may consider that the operations of this embodiment are capable of larger reduction in cost of time than the conventional operations are. In addition, since file copying is not performed between the user memory and the kernel memory in this embodiment, only a small memory capacity may be required for memory copying, which also contributes to cost reduction.

The present invention employing the above configuration may be capable of improving the operational performance of the web application server by reducing the processing cost of memory copying. The processing cost reduction can be achieved by eliminating a read operation of a file unnecessary for dynamic generation of an HTML file.

Hereinabove, a description has been given of this embodiment. However, the technical scope of the present invention is not limited to the scope of this embodiment. For example, although the application execution unit 120 is described as a PHP language processor in the embodiment, any other processor capable of describing a script in an HTML file may be employed. Meanwhile, although the communication channel (SAPI) between the HTTP server 110 and the application execution unit 120 is described as FastCGI, any other SAPI such as mod php may be used. Furthermore, the operations of this embodiment may be used in combination with the operations shown in FIG. 9 in the web application server 100. Specifically, the operation of the embodiment may be dynamically applied when the difference explained in FIG. 10 becomes larger than 0, by carrying out a test while the web application server 100 is in use.

Specifically, inspections are made during execution of the operations, and when the difference explained in FIG. 10 exceeds zero this embodiment may be dynamically applied to the operations. In addition, it is obvious from the description in the scope of claims, that various modifications and improvements added to the above embodiment are also included in the technical scope of the present invention.

What is claimed is:

1. A server that generates an HTML file upon receipt of an HTTP request, comprising:
   a processor;
   a memory coupled to the processor;
   an application execution unit configured to generate the HTML file based on the HTTP request; and
   an HTTP server configured to receive the HTTP request and return an HTTP response to the HTTP request, the HTTP response including the HTML file generated by the application execution unit, the application execution unit being configured to execute a script in generating the HTML file, and to generate an object constituting the HTML file without reading a specific file if an instruction code of the script corresponds to the specific file and does not request modification to contents of the specific file, wherein the generated object contains a link to the specific file, wherein the specific file is accessible by the HTTP server, wherein the HTTP server transmits the specific file together with the HTML file generated by the application execution unit if the HTML file includes the generated object and an original instruction code of the object requests transmission of the specific file, and wherein an un-updated file is transmitted by a link name, and an updated file is transmitted by an original file name.

2. The server according to claim 1, wherein the HTTP server directly loads the specific file to a socket buffer for transmission provided in a kernel space of a memory, and then transmits the socket buffer.

3. The server according to claim 1, wherein the instruction code requesting transmission of the specific file is an instruction code to display contents of the specific file held in a storage device, and the HTTP server obtains and transmits the specific file that is designated by the object generated by the application execution unit and that is held in the storage device, the object being generated by processing the instruction code to display contents of the specific file.

4. The server according to claim 3, wherein:

with respect to the instruction code to display contents of the specific file held in the storage device, the application execution unit generates and retains a copy of the specific file on which the writing operation has not yet been performed if a writing operation is performed on the specific file before the transmission of the specific file by the HTTP server; and the HTTP server transmits the specific file on which the writing operation has not yet been performed.

5. A server that generates an HTML file upon receipt of an HTTP request, comprising:

a processor;

a memory coupled to the processor;

an application execution unit configured to generate the HTML file based on the HTTP request; and an HTTP server configured to receive the HTTP request and return an HTTP response to the HTTP request, the HTTP response including the HTML file generated by the application execution unit, wherein:

the HTTP response is transmitted without a copy to user memory;

the application execution unit executes a script in generating the HTML file;

the application execution unit writes information specifying a path to a specific file in an object without reading the specific file if an instruction code of the script is an instruction code to display contents of the specific file; and the HTTP server identifies the specific file on a basis of the information and transmits the specific file together with the HTML file if the HTML file generated by the application execution unit includes the object in which the information specifying the specific file is written.

6. The server according to claim 5, wherein:

with respect to the instruction code to display contents of the specific file held in the storage device, if a writing operation is performed on the specific file before the transmission of the specific file by the HTTP server, the application execution unit generates and retains a copy of the specific file on which the writing operation has not yet been performed; and the HTTP server transmits the specific file on which the writing operation has not yet been performed.

7. The server according to claim 6, wherein the application execution unit generates a copy for a case where the writing operation is performed on the specific file, by use of a hard link having a Copy-on-write function implemented in an operating system.

8. The server according to claim 6, wherein the application execution unit:

locks the specific file;

generates a hard link to a copy of the specific file;

monitors writing to the specific file;

generates the copy in response to a writing operation being carried out on the specific file; and unlocks the specific file after transmitting the copy to the HTTP server.

9. The server according to claim 5, wherein, if an instruction code of the script is an instruction code for a second file other than the specific file, and if contents of the second file are to be changed, the application execution unit reads the second file, performs processing, and generates an object that includes the contents of the second file.

10. A server that generates an HTML file upon receipt of an HTTP request, comprising:

a processor;

a memory coupled to the processor;

an application execution unit configured to generate the HTML file based on the HTTP request, an HTTP server configured to receive the HTTP request and return an HTTP response to the HTTP request, the HTTP response including the HTML file generated by the application execution unit, wherein:

the application execution unit executes a script in generating the HTML file;

the application execution unit writes a path specifying a specific file in an object without reading the specific file if an instruction code of the script is an instruction code to display contents of the specific file;

with respect to the instruction code to display contents of the specific file held in the storage device, if a writing operation is performed on the specific file before the transmission of the specific file by the HTTP server, the application execution unit generates and retains a copy of the specific file on which the writing operation has not yet been performed; and if the HTML file generated by the application execution unit includes the object in which the path specifying the file is written, the HTTP server identifies the specific file held in the storage device on a basis of the path and transmits the specific file on which the writing operation has not yet been performed together with the HTML file generated by the application execution unit, wherein dynamic generation of an HTML file corresponding to an HTTP request is implemented by embedding the generated HTML file within the original HTML file.

11. A method for generating an HTML file upon receipt of an HTTP request, comprising:

executing, based on the HTTP request, a script for generating the HTML file, and if an instruction code of the script corresponds to a specific file and does not request modification to contents of the specific file, performing processing to generate an object without reading the specific file, wherein the generated object contains a link to the specific file;

handling file processing by a dedicated character string object;

reading, by an HTTP server, the generated object;

in response to reading the generated object, directly loading the specific file to a socket buffer for transmission provided in a kernel space of a memory if the instruction code requests transmission of the specific file; and transmitting the generated HTML file together with the specific file loaded to the socket buffer as an HTTP response.

12. A program product including a non-transitory storage medium readable by a media drive and including instructions for causing a computer to function as:

application execution means for generating an HTML file based on an HTTP request; and an HTTP server for receiving the HTTP request and returning an HTTP response to the HTTP request, the HTTP response including the HTML file generated by the application execution means, wherein:

the HTTP request is received by the HTTP server without receiving the HTML file;

the application execution means executes a script in generating the HTML file; and performs, if an instruction code of the script corresponds to a specific file and does not request modification to contents of the specific file, processing to generate an object having a path to the specific file without reading the specific file; and with respect to the object generated by the application execution means through the processing without reading the specific file, if the instruction code requests transmission of the specific file, the HTTP server transmits the specific file together with the HTML file generated by the application execution means.

* * * * *